Patented Apr. 25, 1939

2,156,193

UNITED STATES PATENT OFFICE 2,156,193

ANTISEPTIC, DISINFECTING, AND PRESERVING MEDIA

Bruno Puetzer, Albany, N. Y., assignor to Winthrop Chemical Company, Inc., New York, N. Y., a corporation of New York No Drawing. Application December 14, 1934, Serial No. 757,547. In Germany December 16, 1933

9 Claims. (Cl. 167—22)

This invention relates to new bactericidal media.

In accordance with the present invention new bactericidal media are obtainable by the manufacture of products which comprise as active ingredients guanyl- and biguanyl compounds wherein the carbon atom of the guanyl group —C(=NH)—NH$_2$ or the one carbon atom of the biguanyl group —C(=NH)—NH—C(=NH)—NH$_2$ is connected by an oxygen or sulfur atom with a higher aliphatic radical containing from about 10 to about 16 carbon atoms.

The said new guanyl- and biguanyl compounds are obtained, for instance, by condensation of an aliphatic alcohol or mercaptane of from about 10 to about 16 carbon atoms with cyanamide, dicyandiamide or alkyl or arylalkylether of an isourea, a guanylisourea, an isothiourea or guanylisothiourea. Also the salts of the said components may be employed. The reaction between an aliphatic alcohol and cyanamide, for instance, performs in accordance with the following equation:

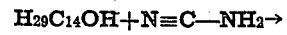+N≡C—NH$_2$→
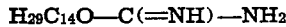—C(=NH)—NH$_2$

An aliphatic alcohol and, for instance, a guanylisothiourea-benzylether react with one another in the following manner:

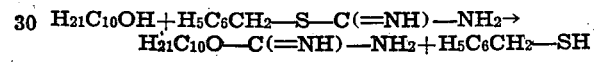

The reaction with higher aliphatic mercaptanes proceeds in an analogous manner as indicated for the alcohols.

Instead of the higher aliphatic alcohols and mercaptanes their reactive esters likewise may be used in this reaction, for instance, the esters with the hydrohalic acids and with aromatic sulfonic acids. Such esters may be reacted with thiourea and guanylthiourea, or with the salts of the said compounds. Cetylbromide, for instance, reacts with thiourea or guanylthiourea with the formation of isothiourea-cetylether and guanylisothiourea-cetylether.

The guanyl- and biguanyl compounds may be further obtained by reacting upon higher molecular rhodanides containing an aliphatic radical of from 11 to about 16 carbon atoms with ammonia, amines, guanidines or their salts. Dodecylrhodanide, for instance, yields with ammonia-isothiourea- and with guanidine guanylisothiourea-dodecylethers.

The above mentioned higher aliphatic radicals of from about 10 to about 16 carbon atoms may be saturated or unsaturated and may contain substituents, such as the hydroxy, alkoxy and amino group. The carbon chain of the higher aliphatic radical may be interrupted by other members or groups, for instance, an ether-like bound oxygen or sulfur group, by amino groups or even by cyclic groups. A cyclic group may also be part of the connecting member between the guanyl radical and the higher aliphatic radical. The amino groups of the guanyl- and biguanyl radical may be substituted by alkyl groups. The amino groups of the guanyl radical may also be connected with one another by an alkylene group, so that the guanyl group is a member of a heterocyclic nucleus.

The guanyl and biguanyl compounds are generally crystalline products. In the form of the free bases they are practically insoluble in water but soluble in organic solvents, such as alcohols, ether, acetone and the like. In the form of their salts with mineral acids, for instance, the hydrohalic acids, sulfuric acid and nitric acid, as well as in the form of their salts with organic acids, such as acetic, lactic, citric and benzoic acid, the new products are soluble in water and in alcohol but insoluble in ether. In view of their excellent bactericidal activity the new products may be used for instance as antiseptics, further for outer disinfections, for instance, for the disinfection of medical instruments, bandages and the like. Since the new compounds likewise display a considerable wetting-, foaming- and dispersing action, they may likewise find application as disinfecting cleaning agents. Because of the above specified properties the new compounds are also suitable as additions to cosmetica, such as face lotions, gargles and the like. They may also serve as a means to dissolve water-insoluble substances, such as medicines, ethereal oils and the like. Because of their bactericidal action they are also suitable as preserving agents.

The invention is further illustrated by the following examples without being restricted thereto:

*Example 1*.—74.5 grams of dodecanol, 8.5 grams of cyanamide and 23 grams of cyanamide-dihydrochloride are gradually heated to 70–90° C. while stirring. The mixture is cooled after about three hours' heating in the water-bath, the separated crystal magma is made into a paste while adding ether, filtered with suction and recrystallized from acetone-ether. The hydrochloric acid salt of dodecylisourea forms colorless crystals melting at 93° C. It is soluble in water and has soap-like properties. The free dodecylisourea crystallizes from ligroin in colorless crystals melting at 78° C.

When using instead of dodecanol equivalent quantities of decyl-, tetradecyl- or cetyl alcohol, decylisourea melting at 70° C., tetradecylisourea melting at 86° C. and cetylisourea melting at about 94° C. are obtained.

Example 2.—16 grams of thiourea, 15 ccs. of alcohol and 51.5 grams of dodecylbromide are heated to boiling for 5 hours. The clear solution is treated with a small quantity of acetone, filtered and precipitated with ether.

The S-dodecylisothiourea-hydrobromide forms colorless crystals melting at 111° C., the hydrochloride obtained from the base melting at 82° C., forms crystals melting at 133° C. The aqueous solution of the salts has soap-like properties.

In an analogous manner there are obtained in the form of colorless crystals the hydrobromide of the S-decylisothiourea melting at 99° C. and the hydrochloride of the S-dodecyl-N-methylisothiourea (base melting at 66–67° C.)

When heating a mixture of the aliphatic hydrocarbon bromides (about $C_{10}$—$C_{16}$) with thiourea, a mixture of the S-alkylisothiourea- hydrobromides ($C_{10}$—$C_{16}$) of the same properties as the products obtained from the single components is obtained.

Example 3.—19 grams of guanylthiourea, 40 ccs. of alcohol and 42 grams of dodecylbromide are heated to boiling for several hours. The solution formed is filtered and treated with ether. The S-dodecylguanylisothiourea-hydrobromide forms colorless crystals melting at 140° C.

Example 4.—16 grams of thiourea are dissolved in 300 ccs. of acetone and a solution of 46.9 grams of dodecylchloromethylether (boiling at 126° C. under 4 mm. pressure, obtained from dodecanol, formaldehyde and hydrochloric acid) in 100 ccs. of acetone is added to the mixture at room temperature. After cooling the colorless crystals of the S-dodecyloxymethyl-isothiourea-hydrochloride are filtered with suction. They melt at 134° C.

Example 5.—The dodecylisothio-ethylene-urea-hydrobromide of the formula:

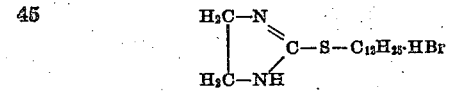

melting at 82° C. is obtained by boiling 10.2 grams of ethylenethiourea and 10 ccs. of dry alcohol with 25 grams of dodecylbromide for 15 hours under reflux. Thereupon ether is added to the mixture and the crystallization formed is recrystallized from acetone.

I claim:

1. An antiseptic, disinfecting, and preserving medium comprising essentially, as an active ingredient, a compound of the group consisting of guanyl and biguanyl compounds in which a carbon atom of the guanyl or biguanyl group is connected with an aliphatic hydrocarbon radical of from 10 to 16 carbon atoms by means of a connecting member selected from the group consisting of oxygen and sulfur atoms.

2. An antiseptic, disinfecting, and preserving medium comprising essentially, as an active ingredient, a compound of the group consisting of a guanyl and biguanyl compound of the formula:

wherein R stands for an aliphatic radical containing 10 to 16 carbon atoms selected from the group consisting of hydrocarbon radicals and of aliphatic radicals which contain oxygen and sulfur as members of the aliphatic chain, $R_1$ stands for a substituent selected from the group consisting of hydrogen, alkyl and the guanyl group, $R_2$ stands for a substituent selected from the group consisting of hydrogen and alkyl and X stands for a member selected from the group consisting of oxygen and sulfur atoms.

3. An antiseptic, disinfecting, and preserving medium comprising essentially, as an active ingredient, a compound of the group consisting of a guanyl- and biguanyl compound of the formula:

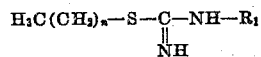

wherein $R_1$ stands for a substituent selected from the group consisting of hydrogen, alkyl and the guanyl group and $n$ stands for one of the numbers 9 to 15.

4. An antiseptic, disinfecting, and preserving medium comprising essentially, as an active ingredient, a guanyl compound of the formula:

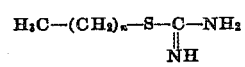

wherein $n$ stands for one of the numbers 9 to 15.

5. An antiseptic, disinfecting, and preserving medium comprising essentially, as an active ingredient, the guanyl compound of the formula:

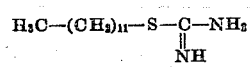

which product melts in the form of the free base at 82° C., in the form of its hydrobromide at 111° C. and in the form of its hydrochloride at 133° C.

6. An antiseptic, disinfecting, and preserving medium comprising essentially, as an active ingredient, the guanyl compound of the formula:

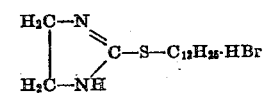

7. An antiseptic, disinfecting, and preserving medium comprising essentially, as an active ingredient, the guanyl compound of the formula:

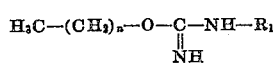

wherein $R_1$ stands for a substituent selected from the group consisting of hydrogen, alkyl and the guanyl group and $n$ stands for one of the numbers 9 to 15.

8. An antiseptic, disinfecting, and preserving medium comprising essentially, as an active ingredient, the guanyl compound of the formula:

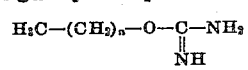

wherein $n$ stands for one of the numbers 9 to 15.

9. An antiseptic, disinfecting, and preserving medium comprising essentially, as an active ingredient, the guanyl compound of the formula:

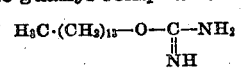

BRUNO PUETZER.